Aug. 5, 1969 R. J. LAHR ET AL 3,459,946

SOLID STATE STORAGE DEVICE

Filed July 5, 1968 4 Sheets-Sheet 1

INVENTORS
PAUL F. EVANS
HAROLD D. LEES
ROY J. LAHR

BY Ronald Zibelli

ATTORNEYS

INVENTORS
PAUL F. EVANS
HAROLD D. LEES
ROY J. LAHR

BY Ronald Zibelli

ATTORNEYS

INVENTORS
PAUL F. EVANS
HAROLD D. LEES
ROY J. LAHR
BY Ronald Zibelli
ATTORNEYS

INVENTORS
PAUL F. EVANS
HAROLD D. LEES
ROY J. LAHR

BY Ronald Zibelli

ATTORNEYS

United States Patent Office 3,459,946

Patented Aug. 5, 1969

3,459,946

SOLID STATE STORAGE DEVICE

Roy J. Lahr, Penfield, Paul F. Evans, Pittsford, and Harold D. Lees, Henrietta, N.Y., assignors to Xerox Corporation, Rochester, N.Y., a corporation of New York Continuation-in-part of application Ser. No. 692,049, Dec. 20, 1967. This application July 5, 1968, Ser. No. 747,043

Int. Cl. H01j 31/58

U.S. Cl. 250—213 12 Claims

ABSTRACT OF THE DISCLOSURE

A method of producing a solid state image pick-up and storage device is disclosed herein. This method involves positioning a plurality of fine conductive wire on an adhesively-coated supporting substrate, each of said wires being coated with an insulative material, abrading the surface of the wires to expose the conductive portions thereof, etching away a portion of the conductive material of each wire while leaving the insulative material intact, filling the space between the insulative material with an electroluminescent phosphor, and coating the phosphor-insulative material surface with a field-effect semiconductor layer. The supporting substrate can take numerous configurations, for example, a cylindrical drum, an endless flexible belt, a flat plate, etc. When the storage device is produced on a flexible, non-planar surface, it may be utilized in that configuration or may be cut parallel to the axis thereof and opened up to form a flat storage panel. Individual conductive wires may be exposed to allow for suitable electrical connections. A keyboard input display device utilizing this storage device configuration is also described.

Cross reference to parent application

This application is a continuation-in-part application of application Ser. No. 692,049 filed Dec. 20, 1967, both applications being assigned to the same assignee.

Background of the invention

In general the present invention relates to solid state storage devices and more specifically to the production and fabrication of field-effect solid state image pick-up and storage drums and panels.

At present a wide variety of solid state imaging, display and storage devices are known, but in general they have not received significant utilization because of the practical problems encountered in their operation. The storage action of these devices depends on one of several different phenomena including the slow decay of conduction after excitation of a photoconductive material, the hysteresis effect in photoconductors and optical feedback. Some of the factors operating against the practical use of such solid state imaging and storage devices include low sensitivity to input radiation, low light output, limited half-tone capability and difficulty in providing adequate image erasure.

For example, one type of solid state imaging device involves a display panel consisting of a layer of electroluminescent material such as described in patents to Benjamin Kazan, U.S. Nos. 2,768,310 issued Oct. 23, 1956, and 2,949,537 issued Aug. 16, 1960. As described therein, the images are produced by an increase in conductivity of the portions of a variable impedance material, in this instance a photoconductive material, against which incident radiation impinges the conductivity increase produces a corresponding luminescence in the adjoining portion of the electroluminescent material. In such imaging devices, the conductance of the various impedance materials may have a reasonably long decay time after the incident radiation is removed so that the image is stored for a considerable period of time. However, such imaging devices have problems of maintaining sufficient brightness during the photoconductive decay period. More important, they have a problem of image removal which generally takes substantial periods of time.

A further type of solid state imaging device is the hysteresis-type photoconductor panel wherein an electric field is simultaneously applied to the photoconductive material. In this arrangement the photoconductive material becomes conductive when exposed to a small amount of light, the conductivity remaining at an almost constant level for substantial periods of time instead of gradually decaying after excitation. The half-tone response and image brightness of such panels are relatively poor and their operation is critically dependent upon the supply voltage. Further, the light output of individual picture elements tends to be noisy and erratic.

In some storage panels optical feedback is allowed to take place between the output phosphor layer and the input photoconductive layer of a two-layer panel. Because of the regenerative action, excitation of the photoconductor by external light above a certain threshold causes the output to rise to a saturation level. To prevent optical coupling between adjacent elements which would cause image spreading, extreme care is required in the panel design to confine the light from each luminescent picture element only to the corresponding photoconductor element. Because of the bi-stable nature of such panels, only black-white images without half-tone can be stored.

More recently a field-effect or charge-controlled storage and display panel has been developed by Kazan et al. Panels of this type are described in full in U.S. application Ser. No. 582,856 filed Aug. 29, 1966, and assigned to the common assignee of the present application. Briefly, a charged controlled storage device of this type comprises an electroluminescent panel including a plurality of spaced electrodes on one surface of a supporting substrate, a layer of electroluminescent material overlying the plurality of electrodes and forming a part of the electrical connection between the electrodes and a layer of field-effect semiconductive material overlying the layer of electroluminescent material and forming a succeeding part of the electrical connection between the electrodes. The electroluminescent panel has a surface capable of retaining an electrostatic charge pattern. At least a portion of the electroluminescent material forms a part of the electrical connection between the electrodes with a successive part of the electrical connection being formed by a portion of the field-effect semiconductor material. It should be noted that field-effect semiconductor material is capable of conducting current through its bulk without substantially altering the charge pattern on the charge retaining surface. By a modification of the electrostatic charge pattern on the charge-retaining surface a corresponding image can be produced and stored by such an electroluminescent device.

As used in the aforementioned application as well as in the present application, the term "field-effect semiconductor" refers to a material capable of conducting current through the body thereof but which has the conductance thereof modified by applying an electric field perpendicular to the current flow thereby creating a region which effectively reduces the conducting cross-section of the semiconducting material or charges the conductivity of the material itself. Thus, an electrostatic charge placed on the surface of a field-effect semiconductor will regulate the current flow between adjacent electrodes beneath the charged area. By controlling current flow the electroluminescent phosphor can be made to luminesce in an image configuration. The resulting image may be viewed on the display panel until such time as the electrostatic charge pattern is modified or the current cutoff and is stored until the charge pattern decays or is erased.

In the preferred form of the material, the field-effect semiconductor should be capable of retaining for substantial periods of time an electrostatic charge pattern on its surface and conducting current through the body thereof without substantially altering the surface charge pattern. When a single material has both of these physical properties it is perhaps most properly referred to as a "storing field-effect semiconductor." That is, the storing field-effect semiconductor is capable of retaining an electrostatic charge pattern on its surface which then acts to produce the perpendicular electric field for modifying the conductance of the semiconductor material. Suitable materials exhibiting this combination of characteristics include zinc oxide, lead oxide, and cadmium oxide among others.

Addtionally, many semiconductors which exhibit the field-effect phenomena can be adapted to the practice of these inventions even though they are, initially, incapable of retaining an electrostatic charge pattern on their surface for the desired period of time. This modification is made by depositing a layer of insulating material on the side of the field-effect semiconductor material opposite the side in contact with the electroluminescent phosphor; the deposited electrostatic charge pattern resides on the insulated surface rather than on the surface of the semiconductor material itself when this approach is taken. Typical semiconductors exhibiting the field-effect phenomena which can be modified by a deposition of an insulator layer include cadmium sulfide, zinc sulfide, activated zinc sulfide, zinc oxide, cadmium selenide and the like. In the alternative a barrier layer can be produced along the outer surface of the semiconductor material by suitably doping the semiconductor to provide a p-n junction. The junction will act as a blocking layer preventing the passage of surface charge to the underlying material.

For brevity, all forms of the field-effect semiconducting material will be referred to herein as the semiconducting material or the field-effect semiconducting material, it being understood that the storage panel has an exterior non-supporting surface which is capable of retaining an electrostatic charge pattern thereon for substantial periods of time.

It is thus apparent that the term "field-effect semiconductor" has been defined to include single layer materials as well as multi-layered structure wherein the semiconductor material is modified as stated above. While these materials have been drawn together for purposes of definition, they are not true equivalents since in many circumstances they will require different modes of operation. More importantly, though the results attained from these different structures may be equivalent from an operational point of view, it should be appreciated that the capability of achieving a desired result with a suitable material renders that material superior to a second material which must be modified in the stated manner, to achieve the same result.

Besides substantially pure layers of the semiconductor a wide variety of compositions can be utilized which comprise the semiconductor dispersed in a non-conductive resin binder such as polyvinylchloride. The ratio of semiconductor to binder can be in the range of 3:1 to 50:1. If the semiconductor is also a photoconductor, as for example in the case of zinc oxide, then it should have the aforementioned properties as well as being capable of dissipating the surface charge in response to impinging radiation. When photoconductive materials are utilized various dyes and sensitizers can be added to the composition to extend or increase the spectral response of the composition. Additionally, multi-layered structures of photoconductor and semiconductor material may be employed.

In the preferred technique of operation, an alternating current voltage is applied between the spaced electrodes which is sufficient to induce a electroluminescence when the semiconductor material is in a low impedance state. It has been found that the deposition and retention of an electrostatic charge on the charge-retaining surface of the electroluminescent panel can be used to control the flow of current from electrode to electrode. Deposition of the electrostatic charge increases the impedance of the semiconductor thereby reducing or interrupting the flow of current in adjacent areas. Reduction of current flow will cause a corresponding reduction in light output from the electroluminescent layer resulting in a half-toned respone. If the current is lowered below that which is sufficient to induce electroluminescence, luminescence will not occur and that particular portion of the storage device will appear dark. Conversely, the impedance is lowered and current flow increased as the charges are neutralized or removed from the surface. Accordingly, by selectively placing and maintaining a charge pattern on the surface of the electroluminescent panel an image can be produced and stored upon the device.

In an alternate technique of operation, an alternating current voltage is applied between the spaced electrodes which is slightly insufficient to induce electroluminescence when the semiconductor material is in its normal impedance state. By forming an electrostatic charge of proper polarity on the charge-retaining surface of the electroluminescent panel the impedance of the semiconductor material can be lowered so that current will flow between spaced electrodes through the electroluminescent layer thereby resulting in light output. Conversely, the impedance is increased and current flow decreased as these charges of proper polarity are neutralized or removed from the charge-retaining surface. Once the impedance increases to a point where the current is lowered below that which is sufficient to induce electroluminescence, luminescence will not occur and that particular portion of the storage device will appear dark. Thus, images can be produced and stored upon this device by selectively placing and maintaining a charge pattern on the charge-retaining surface.

The polarity of surface charge which will reduce conductivity through the field effect semiconductor layer is the same as the polarity of charges which are preferentially conducted through that layer. That is, an n-type semiconductor will have the conductivity therethrough diminished by the deposition of negative charges on the charge-retaining surface. Conversely, a p-type semiconductor will have the conductivity therethrough diminished by the deposition of positive charges on the charge-retaining surface. On the other hand, conductivity may be increased by depositing charges of opposite polarity to the polarity of charges which are preferentially conducted through the semiconductor layer. By manipulating the operating conditions properly, and by depositing charge of opposite polarity to that preferentially carried by the semiconductor layer, the storage panel in adjacent areas can be made to either glow more brightly or to emit light from previously darkened portions.

When it is desired to produce a white picture on a black background, an electrostatic charge is uniformly deposited over the entire charge retention surface. Neutralizing or removing a portion of the charge will cause current flow in adjacent areas thereby resulting in luminescence of the phosphor layer beneath the areas where charge has been neutralized or removed. A white picture on a black background can also be obtained by depositing a selected electrostatic charge pattern wherein dark background areas correspond to areas of charge deposition. Luminescence of the phosphor layer beneath those areas of the semiconductor layer where no charge resides will produce a white picture on a black background.

When it is desired to have a black picture on a white background, a selected electrostatic charge pattern is placed on the charge retention surface. This results in an increase in the impedance of the semiconductor thereby interrupting the flow of current in adjacent areas. When current flow falls below the level which is sufficient to induce electroluminescence, that portion of the storage device where the charge resides will appear dark, and a black on white picture will be obtained. Alternatively, a uniform electrostatic charge can be applied to the charge retaining surface and then a portion of the charge corresponding to the white background areas can be removed or neutralized to produce the desired result of a black picture on a white background.

The above optical output can also be achieved by applying an alternating current voltage between the spaced electrodes which is insufficient to induce electroluminescence when the semiconductor material is in its normal impedance state. Deposition of charge of proper polarity will cause a decrease in impedance with a corresponding light output in adjacent areas. Whether a black picture on a white background or vice versa results will depend upon the charge deposition and/or removal steps in a manner analogous to that described in the preceding two paragraphs.

It should be noted that if during the time that charges are trapped on the surface of a photoconductive field-effect semiconductor such as zinc oxide, illumination of an appropriate wavelength falls on the zinc oxide, hole-electron pairs will be generated, neutralizing the surface charges in the area subject to illumination. As a result, the zinc oxide will again become conductive in the exposed areas while remaining non-conductive in the charged areas.

While the utility of a storage panel such as described in the aforementioned application and disclosed herein is manifest, a few specific examples of uses may be found helpful. It is contemplated that the output luminescent image from such a panel may be utilized to expose a xerographic plate. Thus, a single input image which is stored on the device can be used to repeatedly expose a xerographic plate for the production of a multiplicity of copies. Since the output image can persist for a substantial period of time, the xerographic plate can be exposed and developed many times before the luminescent image has decayed.

The contact of an insulating surface to a charged zinc oxide layer has been found to have little influence on discharging the latter. Thus a charged sheet of zinc oxide paper can be placed in direct contact with the zinc oxide surface of a storage panel without disturbing the information stored thereon. The output will directly expose the charged zinc oxide paper which can then be developed in a conventional manner. Multiple copies can be made using this technique from a single input image.

It should be noted that once an input signal has resulted in the establishment of a charge pattern, the input signal can be terminated and the output can continue until such time as the electrostatic charge pattern has dissipated from the charge retention surface.

Panels of this type permit formation of a total integrated image based upon an integration of the radiant energy input to the device unlike conventional photoconductive devices which rely substantially upon the instantaneous radiant energy intensity.

Such panels produce both high level output brightness as well as good half-tones unlike prior art devices which in general sacrificed one or the other.

While the panels produced by the method of fabrication described herein operate in a manner substantially as described above and in the referenced U.S. patent application with respect to the Kazan charged controlled storage devices and retain all of advantages and utility of such devices the method of fabrication of the present invention overcomes several of the problems which exist in connection with the Kazan storage panels and results in surprising and unobvious improvements in these panels.

In particular the prior storage panels in this area resulted from cumbersome, complex, and time consuming methods of manufacture which were unsuitable for the production of panels of large size and/or mass produced devices. Furthermore, a great deal of difficulty has been experienced in obtaining drums or panels of high resolution. An even more important problem has existed in achieving the desired degree of image contrast. This difficulty is now known (as a result of the present invention) to arise in large part from the fact that the current flow between electrodes tended to follow lines of the fringing electromagnetic field in the regions between adjacent electrodes as well as the desired path from an electrode through the electroluminescent phosphor into the semiconducting layer, back into the electroluminescent phosphor and to an adjacent electrode. These fringing fields thus resulted in a significant loss of image contrast and to some extent of resolution. The present invention has solved these difficult problems in large part by the discovery of a convenient and practical means of fabricating such panels which results in the electroluminescent material associated with each electrode being isolated from the adjacent electrode by two layers of insulating material. This structure which is made possible by the novel fabrication method disclosed herein eliminates the adverse effects of the fringing fields between adjacent electrodes with the resultant improvement in contrast and resolution.

Accordingly, it is an object of the present invention to provide a new, unobvious, and highly effective electroluminescent storage device and method of fabricating the same which overcomes the deficiencies of the prior art as described above.

It is a further object of this invention to provide an improved field-effect charge-controlled electroluminescent image producing and storage device.

Another object of this invention is to provide an improved, simple, and commercially practical method of fabricating such devices.

Further, it is an object of the present invention to provide an imaging device having good output brightness, long storage, good half-tone response, high resolution and contrast along with simplicity of image production and rapid erasure and to provide a simple, practical means of fabricating the same.

Other objects and a fuller understanding of the invention may be had by referring to the following description and claims taken in conjunction with the accompanying drawings.

Summary of the invention

The present invention overcomes the deficiencies of the prior art and achieve its objectives by providing an insulating barrier between adjacent electrodes in a field-effect charge controlled electroluminescent storage device. Such a storage device is fabricated by positioning a plurality of fine conductive wires, each of which is coated with an insulative material, on an adhesively-coated supporting substrate. The top portion of the conductive wires are abraded to expose the conductive portions of each of said wires and a portion of the conductive material of each wire is etched away while leaving the insulative material intact. The space between the insulative material is filled with an electroluminescent phosphor material and the phosphor-insulative material surface is then coated with a field-effect semiconductor layer.

In one embodiment, the storage device is fabricated by wrapping the plurality of conductive wires about a smooth surface, continuous supporting substrate, such as a cylindrical drum or an endless belt, which may either be flexible or rigid, as is desired. The storage device may then be utilized in the configuration as produced or the supporting substrate, if flexible, may be cut and opened up to form a suitable storage panel. The individual conductive wires are exposed and connected to allow for the desired electrical inputs.

Brief description of the drawings

In order to facilitate the understanding of this invention, reference will now be made to the appended drawings of preferred embodiments of the present invention. The drawings should not be construed as limiting the invention but are exemplary only.

In the drawings.

The storage devices of the present invention are manufactured in the following manner. A cylindrical drum will be used as an exemplary supporting substrate in describing the method of production, it being understood that other supports of a different configuration are equally applicable even though the method may have to be slightly modified in certain nonessential ways, to compensate for the different configuration, as would be obvious to those skilled in this art.

Figure 1:
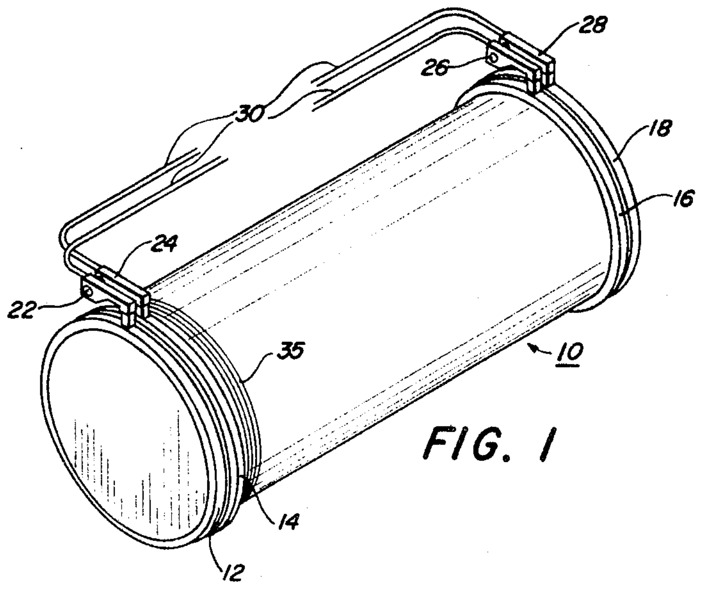
FIGURE 1 is a perspective representation of the supporting substrate, in this instance a cylindrical drum, on which the electrode wires are wound, including the slip rings with electrical input connections.
Figure 2:
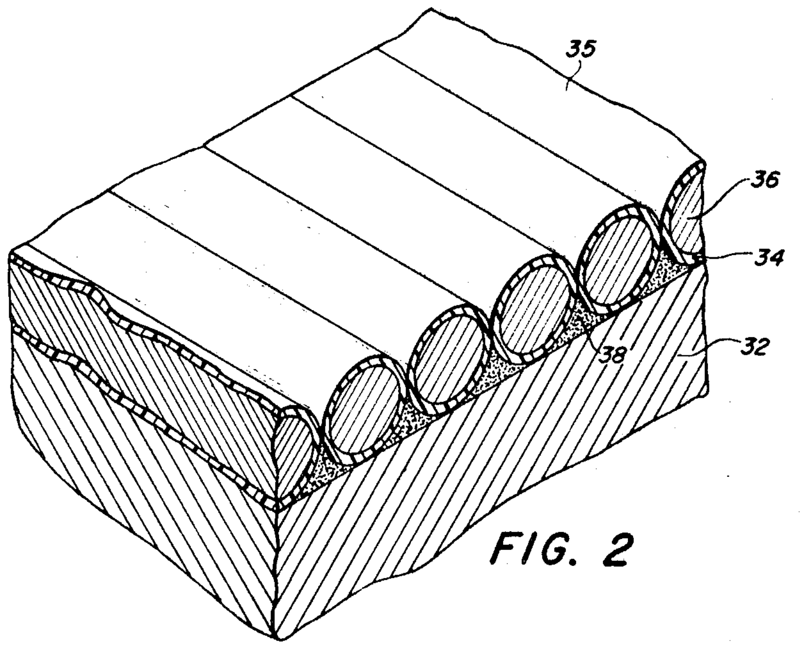
FIGURES 2–6 are cross-sectional perspective representations of the sequence of steps resulting in the fabrication of the desired storage device.

A drum 10 which may be composed of either transparent or opaque substrate material is wound with a plurality of wires 35 as a single layer "solenoid" or coil. FIGURE 1 is an overall representation of drum 10. Drum 10 may be a suitable opaque material or in the alternative may be made of a glass or plastic transparent material. At each end of drum 10 are two slip rings, slip rings 12 and 14 at one end and slip rings 16 and 18 at the other end. Where the plurality of wires 35 wound about drum 10 in a single layer solenoid fashion consists of a pair of wires, one of the wires connects to slip ring 12 at one end and to slip ring 16 at the other end, while the other wire connects to slip ring 14 at one end and to slip ring 18 at the other. In the alternative only two slip rings may be employed, both being at the same end with the wires being run to the opposite one of the respective slip rings through the inside of drum 10 upon having been completely wound about the drum to form a single layer solenoid. In either case the arrangement provides for the input of an alternating current potential to alternate wires of the solenoid array through electrical contacts members 22, 24, 26 and 28 which are hooked to appropriate electrical input lead wires 30 which come from an alternating current transformer or similar source (not shown). A layer of epoxy cement or similar adhesive 38 is applied to drum 10 immediately ahead of the portion of the solenoid being layed down. Within the limits of the drying properties of the adhesive being utilized, the entire drum may be coated prior to wrapping with wires 35 if desired. In the alternative, the epoxy cement may be added after winding the wires 35 on the drum 10 with the cement 38 being drawn into the interstices by capillary action as shown in FIGURE 2.

Suitable means for winding the wires 35 about drum 10 are shown in Paul F. Evans' U.S. Patent No. 3,136,912 which is incorporated herein by reference.

The dimensions of drum 10 selected are dependent upon the size of the image drum or storage panel which is desired. The wires 35 consist of a conductive filament 36 such as a copper wire center covered with an insulating material of similar coating 34, such as insulating varnish. These wires are held to the substrate material 32 of which the drum 10 is composed by means of a suitable adhesive bonding material 38 such as a thermoplastic resin, epoxy or the like.

Other good electrically conductive wires in addition to copper may be utilized. For example, typical good electrical conductors are silver, platinum, brass, and steel alloys. Any insulative coating 34 which will withstand the etching agents utilized for the particular conductive filament 36 may be employed.

Figure 3:
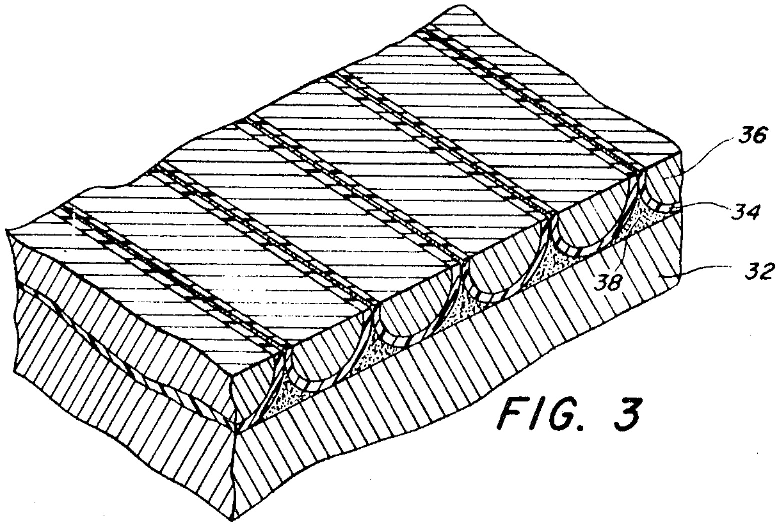

After the wires are firmly cemented in place, the surface of the drum now consisting of the insulating surface 34 of the copper wires 36 may now be abraded by a sandpaper or similar abrading operation to expose the conductive wires surface 36. This step in the process is shown in FIGURE 3. Frequent microscopic examination of the surface throughout the fabrication process may be utilized to insure the achievement of the desired configuration before proceeding with the next step.

Figure 4:
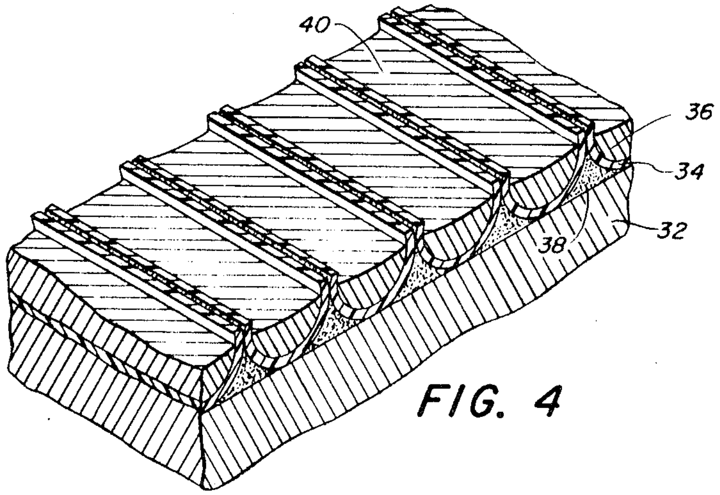

The exposed surfaces of wires 36 are now etched leaving barriers of the insulative material coating 35 between adjacent wires as shown in FIGURE 4. A solution of ferric chloride or of nitric and hydrochloric acid may be utilized to etch away a portion of the copper filament 36. Similarly, other strong etching agents suitable for the material to be etched may be utilized.

After the etching agent has had sufficient time to etch away the desired portion of conductive filament 36 (approximately 25 minutes for a 3 liter aqueous solution containing approximately one pound of ferric chloride for copper wire), the etching agent is rinsed off with water and neutralized with ammonium hydroxide and/or soap or other suitable bases. The neutralizing agents may then be rinsed off with a distilled water rinse and the panel dried with a methanol wash. The resulting configuration resulting from these steps is shown in FIGURE 4.

Figure 5:
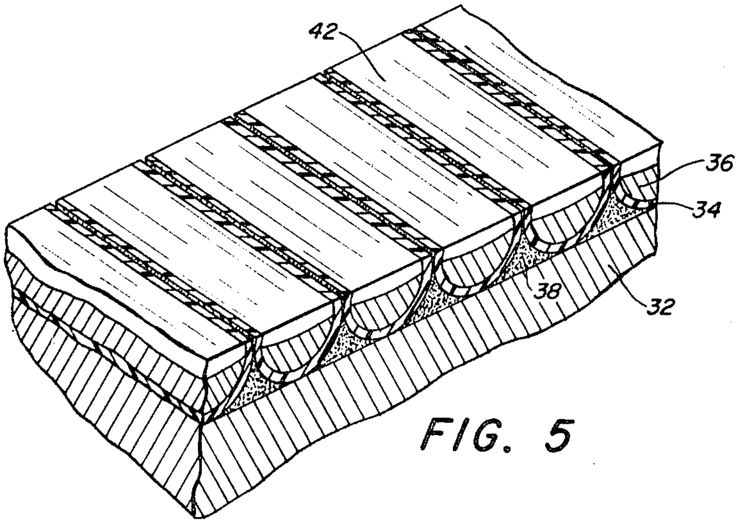

The surface recessed troughs formed by the etching process are now filled with a mixture of electroluminescent phosphors 42 embedded in a resin as shown in FIGURE 5. The purpose of the insulating material barriers 34 is to isolate the adjacent conductive wires 36 even when coated with electroluminescent phosphors 42. At this time, the drum will not light even if a suitable alternating current potential is applied because the insulating material barrier 34 provides a sufficiently high impedance between adjacent conductors 36 and the electric field thus produced across the electroluminescent phosphors 42 is too small.

Typical electroluminescent phosphors include copper chloride and magnesium activated zinc sulfide in an epoxy binder as described by Thornton in the Journal of Applied Physics, vol. 33, No. 10, p. 3045 et seq. Other suitable electroluminescent phosphors are well known in the art and may be found listed in numerous handbooks of materials.

Figure 6:
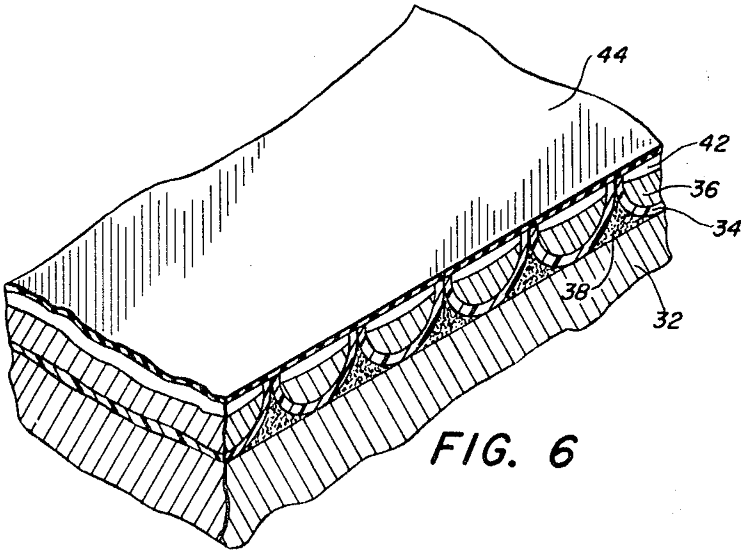

A layer of zinc oxide photoconductor 44 dispersed in a binder is now applied over the barriers 34 and the electroluminescent phosphor 42 as shown in FIGURE 6.

Over the phosphor filled troughs 42, a zinc oxide coating (excess zinc) may be overcoated to form layer 44 using a binder admixture if it is desired to secure improved surface or adhesion characteristics over an unmodified zinc oxide layer.

Since the drum cannot be lighted without the layer of zinc oxide 44 because of the barriers 34 between conducting lines 36, the requirements on the zinc oxide top coating 44 are not as stringent as in the prior art panels of this type.

The characteristics of zinc oxide have been described in general in an article entitled "A Review of Electrofax" by James A. Amick in the RCA Review, Dec. 19, 1959, vol. 20, No. 4, pp. 753–769.

In addition to zinc oxide other typical field-effect semiconductors include cadmium sulfide, cadmium oxide, cadmium selenide, silicon, germanium and the like. Zinc oxide is preferred because of its photoconductive properties as well as the fact that it is easy to deposit in thin film form.

Other typical photoconductors which may be combined with the non-photoconducting semiconductors in a multilayer array include sulfur, anthracene, arsenic sulfide, antimony trisulfide, cadmium sulfide, cadmium selenide, cadmium sulfoselenide, lead oxide, lead sulfide, polyvinyl carbazole, phthalocyanine, quinacridones, zinc sulfide and the like.

Where it is desired, the drums may be made to be addressed optically from inside the drum by use of a transparent drum substrate and a clear epoxy used as the wire binding cement. If desired optically transparent electrically conductive layers such as thin layers of copper oxide, copper iodide, tin oxide, gold or the like with optically transparent varnish barrier layers may also be employed to further facilitate optical addressing from within the drum.

Obviously, the drums may be addressed optically from the outside and panels may be made addressable from either side depending upon the choice of structures.

In operation it will be observed that if the zinc oxide layer 44 is left uncharged it will be present a low impedance and the drum will light when a suitable voltage is applied to alternate wires. A drum constructed in the above manner can be made to darken by applying a charge to the surface of the zinc oxide layer 44. This charge may be placed down uniformly to "erase" the panel by sweeping a corona unit of the type well known in the xerographic arts over the zinc oxide layer. If the surface of the zinc oxide layer 44 is then exposed to light (primarily, in the ultraviolet region) that impinging light will lower its impedance thereby allowing the electroluminescent layers 42 of the drum to "turn on" that is, illuminate. If a selective pattern of light and shadow is addressed to a charged zinc oxide layer 44 a corresponding pattern of illumination will be produced and this pattern will have high contrast because of the employment of the barrier layers 34 between adjacent conductive elements 36 in the preferred embodiment of the present invention.

The storage device may also be operated as indicated above in this application with regard to the storage panel described in the Kazan et al. application, Serial No. 582,856 filed August 29, 1966.

The charge pattern deposited on the zinc oxide layer 44 may be produced or modified by means of electrostatic charge of either polarity which may be deposited on the zinc oxide layer 44 by means of electrographic devices such as the ion gun described in full in U.S. application Serial No. 602,787 filed December 19, 1966, and its continuation-in-part U.S. Serial No. 687,855 filed on or about November 1, 1967. Other means may be used to erase the zinc oxide layer 44 in addition to corona. For example, see the copending application by Evans and Lees, and assigned to the common assignee of this application, Serial No. 692,150 filed Dec. 20, 1967.

The drum configuration of the storage device of the present application may be opened into a panel configuration by cutting the wires 35 transversely parallel with the axis about which they are wrapped. Once opened out into a panel form, alternate wires may be exposed and positioned for suitable electrical connection. See Evans' U.S. Patent No. 3,136,912.

Figure 7:
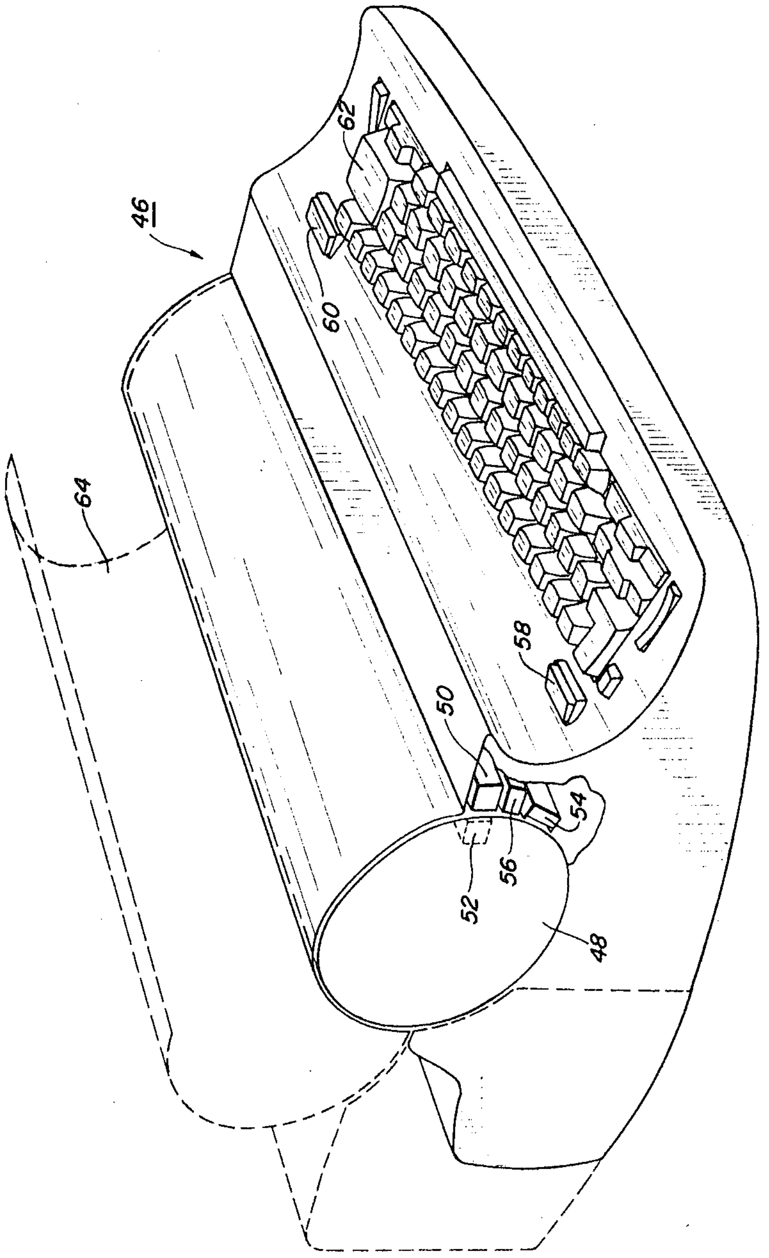
FIGURE 7 is a perspective view of one possible embodiment utilizing the representative cylindrical drum configuration of the present invention.

A display system which is one of many possible uses of the drum configuration of the present invention is shown in FIGURE 7. A typewriter keyboard addressable unit is indicated by 46. A storage and display drum having electroluminescent phosphors and a zinc oxide layer structure fabricated as described above is indicated at 48. In addition to input keys, the keyboard 62 contains a line erase key 58, a drum slew control key 62 and keys for producing a hard copy output. A corona unit charges the display drum 48 uniformly and an optical character generator and addressing unit 50 causes a selected pattern of charge to be produced on the display drum 48. If an error is made or for some other reason it is desired to change the input to a line on the drum 48 this may be done by pushing line erase button 58 which will cause line erase corona unit 54 to selectively erase that line. An alternate position for the optical character generator is indicated by 52. An electrographic scanner 56 producing a bar or dot code may add additional information to the storage drum 48. In this manner an electroluminescent display may be produced on the drum 48 by means of an optical and/or electrographic input operated by a keyboard input control device. An optional removable protective filter cover for the display drum is represented by 64. An optional hard copy output section which by means of reusable dielectric material with suitable toner and fusing stations produces a hard copy output corresponding to the stored display on drum 48 by conventional means well known in the xerographic and electrographic arts is indicated by 66. Obviously numerous other configurations and devices using both the panel and the drum embodiments of the present invention will suggest themselves to those skilled in the art and will fall within the scope of the present invention.

While the invention has been described with reference to a preferred embodiment it will be understood by those skilled in the art that various changes may be made and equivalents may be substituted for elements thereof without departing from the true spirit and scope of the invention. For example, as previously indicated, other supporting substrates having different surface configurations can be utilized. This includes, but is not limited to, flexible endless belt, flat panels, etc. In addition many modifications may be made to adapt a particular situation or material to the teaching of the present invention without departing from the essential teachings.

What is claimed is:

1. A method of fabricating a charge controlled solid state electroluminescent device comprising:

(a) positioning a plurality of insulatively coated conductive wires upon a supporting substrate, (b) bonding said insulatively coated wires to said supporting substrate, (c) abrading said wires to expose the upper conductive surface of each wire, (d) etching said conductive portion of said wires to produce a surface recessed trough while leaving said insulating coatings to form an insulating barrier between adjacent wires, (e) filling said recessed trough with an electrolumescent phosphor material, and (f) applying a thin coating of field-effect semiconductor material over said phosphor-filled trough and insulating barriers.

2. The method of claim 1 wherein adjacent insulatively coated conductive wires are in contact with each other.

3. The method of claim 1 wherein said insulatively coated conductive wires are positioned on said supporting substrate by wrapping said wires about a smooth-surface, continuous supporting substrate.

4. The method of claim 3 wherein said supporting substrate is a cylindrical drum.

5. The method of claim 3 wherein said supporting substrate is an endless flexible belt.

6. The method of claim 1 further comprising cutting said supporting substrate open to form a flat storage panel and exposing said wire ends in alternate pairs to receive a suitable electric potential to operate said panel.

7. A field-effect charge-controlled solid state electroluminescent storage device comprising:

(a) a plurality of paired electrically conducting wires adapted to be addressed by an alternating current potential, said wires being adhesively bound to a substrate and each of said wires being coated in part with an insulating material, (b) a surface recessed trough on the outer surface of each of said conductive wires defined by barrier layers of said insulating material, said trough being filled with an electroluminescent phosphor, and (c) a thin layer of field-effect semiconductor overcoating said electroluminescent phosphor and said barrier layers of insulating material, said barrier layers having sufficient dielectric strength to prevent the luminescence of said electroluminescent phosphors upon the application of a suitable alternating current potential in the absence of said field-effect semiconductor overcoating.

8. The device of claim 7 wherein said substrate has a cylindrical drum configuration.

9. The device of claim 7 wherein said device has the configuration of a relatively thin flat panel.

10. The device of claim 7 wherein said substrate is an endless flexible belt.

11. The device of claim 7 wherein said field-effect semiconductor is zinc oxide.

12. The device of claim 8 wherein said drum is optically addressable from the inside as well as from the outside.

References Cited

UNITED STATES PATENTS

| | | | |
|---|---|---|---|
| 2,972,076 | 2/1961 | Van Santen et al. | 313—108 |
| 3,064,133 | 11/1962 | Murr et al. | 250—213 |
| 3,117,232 | 1/1964 | Diemer et al. | 250—213 |
| 3,327,122 | 6/1967 | Dueker et al. | 250—213 |

WALTER STOLWEIN, Primary Examiner

U.S. Cl. X.R.

29—572; 313—108